Jan. 18, 1927.
C. GABRIELSON
1,614,548
PLATEN CLUTCH
Filed Jan. 26, 1925
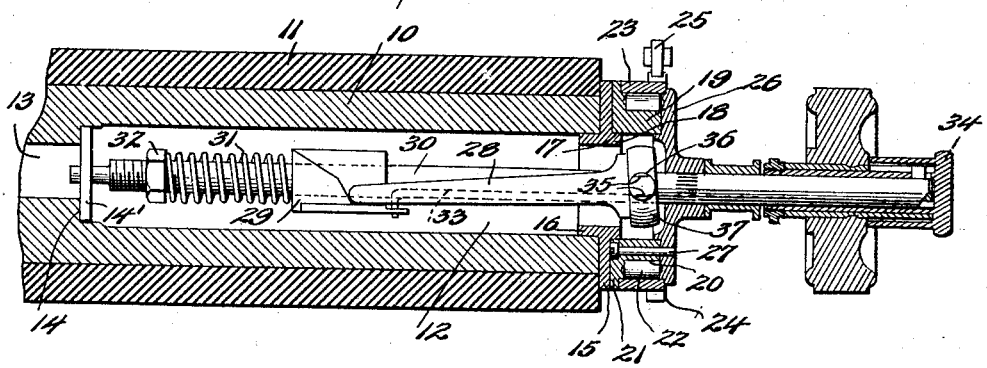
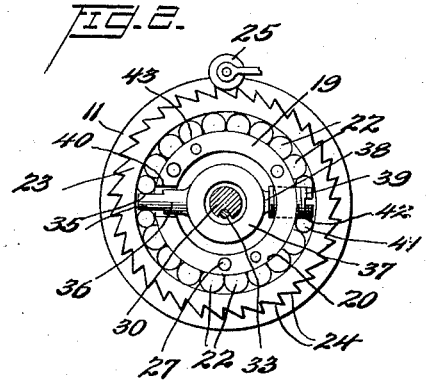
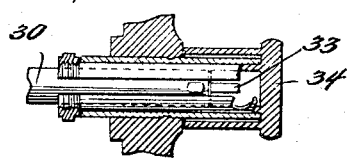
Inventor
Carl Gabrielson,
By Watson, Coit, Morse & Grindle
Attorney Patented Jan. 18, 1927.

1,614,548

UNITED STATES PATENT OFFICE.

CARL GABRIELSON, OF SYRACUSE, NEW YORK, ASSIGNOR TO L. C. SMITH & BROS. TYPEWRITER, INC., OF SYRACUSE, NEW YORK, A CORPORATION OF NEW YORK.

PLATEN CLUTCH.

Application filed January 26, 1925. Serial No. 4,916.

This invention relates to that type of clutch which normally locks the line-space-ratchet wheel to the platen of a typewriter, but which permits the platen to be released so that it may be turned while the ratchet wheel is stationary for irregular spacing and other purposes. The present application discloses an improvement on my previous Patent No. 1,393,277, dated Oct. 11, 1921.

In the accompanying drawings and following specification there is disclosed by way of example, only, a single embodiment of the present invention with the understanding however that various changes may be made by one skilled in the art in the material, size, form, proportion and arrangement of the various parts without departing from the spirit or scope of the attached claims.

In said drawings:

Fig. 1 is a longitudinal central section through the clutch end of a typewriter platen;

Fig. 2 is an end view of a clutch mechanism with the cover plate removed and the shaft shown in section;

Fig. 3 is a longitudinal central section at right angles to that shown in Figure 1 through the clutch release mechanism; and Fig. 4 is a perspective view of one of the locking members.

The clutch mechanism on the platen of a typewriter is subject to considerable usage and it has been found at times that such a clutch fails to operate satisfactorily, sometimes failing to hold and at other times failing to completely release. This condition may result in improper spacing of the lines making it difficult to obtain neat typewritten pages. The present invention overcomes the difficulty by so arranging the locking parts of the clutch that they are always in the same relative relation to each other and cannot cause jamming or failure to hold.

In the above mentioned patent the clutch mechanism and its associated parts is quite fully described and in the present application it is believed to be only necessary to generally mention the various parts. The platen roll 10 may be formed of wood or any other suitable material and provided with the sheath 11 formed of hard rubber or the like. The platen is adapted to be supported in the carriage of the typewriter in any well known manner and is provided at 12 with a large axial bore having a smaller extension 13 at the bottom thereof to provide an intermediate shoulder 14.

At its clutch end the platen is provided with a circular plate 15 having a hub 16 which fits and extends into the bore 12, the plate 15 being attached to the wooden core by screws or any other suitable holding means not shown. The plate 15 has an annular shoulder 17 formed by the flange 18 on the outer side of its hub and upon this shoulder is mounted the inner ring or race member 19 which is similar to the inner race member of a roller bearing and is provided with the cylindrical surface 20 and the inner end flange 21 radiating therefrom. On the cylindrical surface bear the locking members 22 which will be later described in detail, and adapted to rotate upon their outer surfaces is the outer race or ring member 23 carrying the usual ratchet 24 which cooperates with the spring holding pawl or roller 25 and with a line-space feed-pawl not shown. The inner end of the ring or race 23 abuts against the flange 21 and is prevented from moving outwardly by the concentric cap 26 which is rigidly connected both to the inner race member 19 and the end plate 15, such as by suitable screws 27.

As described in the above mentioned patent, the clutch is adapted to be operated by a rocking device having arms 28 which are actuated by a cam block 29 slidably mounted upon the shaft 30 supported concentrically with the platen in the cap 26 and washer 14' abutting against the shoulder 14. The cam block is normally urged toward the clutch by the coil spring 31 surrounding the shaft 30 and abutting at its left end against the stop nut 32. The cam block 29 is adapted to be moved to the left by means of a rod 33 slidably mounted within a groove in the shaft 30 and having its outer end extending beyond this shaft to be engaged by the cap 34 and pressed inwardly in respect to the shaft to move the cam block against the spring and release the operating arms 28 to the position shown in Figure 1. If desired means may be provided for locking the cap 34 in the released position such as the bayonet lock shown in Figure 3, but since this forms no part of the present invention, it will not be described.

The clutch operates to lock the races 19 and 23 together by jamming the locking members 22 between the two rings or races 19 and 23 which are ordinarily free to rotate with respect to each other, the outer ring riding on the surfaces of the locking members 22. These locking members are jammed or crowded against each other and thus move outwardly to engage the inner surfaces of the outer race 23, by means of the flattened faces 35 on the stud 36 which is carried by the collar 37 supporting the clutch actuating arms 28. This collar 37 is provided with an opening to allow it to pass freely over the shaft 30.

It is maintained in position and supported for rotation about an axis transverse to the shaft 30 and through the center of the stud 36 by means of the projecting reduced end 38 of the screw 39 radially mounted in the inner race 19. This end 38 fits into a hole in the collar and forms a journal therefor. The stud 36 has a bearing in the circular hole 40 in this race diametrically opposite from the screw 39 so that it will be evident that the clutch operating arms 28 are free to move within the limits defined by the cam block 29 about an axis through the stud 36 and the projection 38.

The head of the screw 39 projects into the annular space between the races 19 and 23 as do the flattened faces 35 of the stud 36 the remaining portions of this annular space being filled with the locking members 22 so that when the flattened faces 35 are rotated from the position shown in Figure 1 to a position where they form an angle to the axes of the locking members, they will be jammed in the space between the annular race members 19 and 23 and between the head of the screw 39 and the flat faces 35 of the stud 36. They will thus move radially outward to contact with the inner face of the race 23 and lock it to the race 19. This action is assisted by the fact that the locking members 22 cannot move circumferentially in respect to the race 19 owing to the screw head 39 extending into the annular space between the two races.

The most important feature of this invention consists in the shape of the locking members 22. The amount of movement of the wedging stud 36 is quite limited and it is necessary therefore that the aggregate length measured in an arc through each group of locking members shall be slightly less than the distance measured on the same arc from the head of the screw to the flat face of the stud 36 when the clutch is in released position shown in Figure 1, and slightly greater than this length when the operating arms 28 are lifted by the cam faces 29 to wedge these members between the two races. If they are formed as cylinders it will be found almost impossible to make each cylinder truly round and it is therefore obvious that at such times as these cylinders may be so grouped that most of their short diameters all lie upon the above mentioned arc, the clutch may slip and if a large number of cylinders are so positioned, that their longer diameters lie on this arc then the clutch may fail to release. To overcome these difficulties the present invention contemplates forming the locking members as short cylinders each having a flattened side or face 43 the diameters of the cylinders being greater than the radial distance between the two races and the diametrical distance from the center of a flattened side to the opposite surface of the arc being just slightly less than this radial distance between the two races. The locking members 22 are then positioned so that their flattened faces 43 all lie against the inner race and thus the same elements of the surfaces thereof must always abut the adjacent locking members and when once the initial adjustment has been made, no possible change can take place in the aggregate length of each group measured along the arc previously referred to.

The end members of each group are cylinders having a diameter only slightly less than the distance between the two race members and these end members 41 each have a flattened face 42 to abut against either the head of the screw 39 or the flat faces 35 on the end of the stud 36. By providing end members with various width flattened faces, the initial adjustment of the clutch can be very carefully made after which there will be no change and a positive locking and a total disengagement will result when the cam block is actuated as above described. It will therefore be seen that the essential feature of this invention consists in the provision of locking members non-circular in cross section in order that they may always retain their same relative position in respect to each other.

Having thus described the invention what is claimed as new and desired to be secured by Letters Patent is:

1. In a clutch mechanism, in combination, an inner race member and an outer race member forming an annular channel, locking members in said channel, means to exert circumferential pressure on said locking members to crowd them against said outer race member, said locking members being constrained to always engage adjacent members at the same place.

2. In a clutch mechanism in combination, an inner race member, locking members arranged around the periphery thereof, an outer race member normally rotatable around said locking members and means to crowd said locking members into engagement with said outer race member to lock it to the inner race member, said locking members having one axis longer than the distance between said race members.

3. In a clutch mechanism, in combination, an inner race member, locking members arranged around the periphery thereof, an outer race member rotatable on said locking members, means to lock said races together comprising a part extending between said races to crowd said locking members apart, said locking members being constrained against rotation about their own axes at all times.

4. In a clutch mechanism, in combination, an inner race member, locking members arranged around the periphery thereof, an outer race member rotatable on said locking members, means to lock said races together comprising a part extending between said races to crowd said locking members apart, each of said locking members having a face adapted to engage a race member to prevent relative rotation of the locking member at all times so that each locking member will always retain its same relative position in respect to the remaining locking members.

5. The combination with a typewriter platen of a head thereon having a raceway, locking members in said raceway, a ratchet ring mounted on said locking members and means for crowding the locking members to lock the ratchet ring to the platen, said means including an abutment extending into the raceway at one point thereof and a device extending into the raceway at another point thereof and means for turning said device to crowd the locking members against the abutment and radially against the ratchet ring to lock it to said platen, said locking members being cylinders having a flattened side resting on said inner race member.

In testimony whereof I hereunto affix my signature.

CARL GABRIELSON.